US009392908B2

(12) United States Patent
Edwards et al.

(10) Patent No.: US 9,392,908 B2
(45) Date of Patent: Jul. 19, 2016

(54) HERB GRINDER

(71) Applicant: Santa Cruz Shredder, Inc., Campbell, CA (US)

(72) Inventors: Mark E. Edwards, Los Gatos, CA (US); Nathaniel I. Stewart, Los Gatos, CA (US)

(73) Assignee: SC Shredder IP, LLC, Campbell, CA (US)

( * ) Notice: Subject to any disclaimer, the term of this patent is extended or adjusted under 35 U.S.C. 154(b) by 110 days.

(21) Appl. No.: 14/194,153

(22) Filed: Feb. 28, 2014

(65) Prior Publication Data

US 2014/0217213 A1 Aug. 7, 2014

Related U.S. Application Data

(63) Continuation-in-part of application No. 13/433,060, filed on Jun. 11, 2012, now abandoned.

(51) Int. Cl.
| | |
|---|---|
| *A47J 42/00* | (2006.01) |
| *A47J 42/40* | (2006.01) |
| *A47J 42/38* | (2006.01) |
| *A47J 42/12* | (2006.01) |
| *A47J 42/14* | (2006.01) |

(52) U.S. Cl.
CPC .......... *A47J 42/40* (2013.01); *A47J 42/12* (2013.01); *A47J 42/14* (2013.01); *A47J 42/38* (2013.01)

(58) Field of Classification Search
CPC ........... A47J 42/00; A47J 42/12; A47J 42/14; A47J 42/20; A47J 42/32; A47J 42/34; A47J 42/38; A47J 42/40
USPC ........................ 241/168, 169, 169.1, 273.3; 131/105–110, 311–312
See application file for complete search history.

(56) References Cited

U.S. PATENT DOCUMENTS

| | | | | |
|---|---|---|---|---|
| 2,304,662 A | * | 12/1942 | Shuart ................ | F25C 5/043 125/23.01 |
| 3,335,772 A | * | 8/1967 | Menge ................ | A47J 43/044 241/277 |
| 3,381,903 A | * | 5/1968 | Howling .............. | B33F 9/04 241/279 |
| 3,545,686 A | * | 12/1970 | Brown ................ | B02C 18/148 241/243 |
| 3,565,351 A | * | 2/1971 | Ross, Jr. ............. | B02C 19/0081 100/240 |
| 4,280,666 A | * | 7/1981 | Jones ................. | A47J 42/34 241/100 |
| 5,195,684 A | * | 3/1993 | Radzins .............. | D21B 1/066 241/152.2 |
| 5,340,042 A | * | 8/1994 | Bergkamp ........... | A01D 34/13 241/283 |
| 5,673,861 A | * | 10/1997 | Miller ................. | A61L 11/00 241/163 |
| 5,875,979 A | * | 3/1999 | Walters ............... | B02C 17/007 241/299 |
| 5,890,665 A | * | 4/1999 | Arasmith ............ | B02C 7/04 241/261.2 |
| 6,834,817 B2 | * | 12/2004 | Manson .............. | B02C 13/22 241/169.1 |

(Continued)

*Primary Examiner* — Faye Francis
(74) *Attorney, Agent, or Firm* — Kilpatrick Townsend & Stockton LLP (57) ABSTRACT

A shredder or grinder for dried material such as herbs of dried leaves is a cylindrical container formed of a top element and a base element forming a chamber, the top element and the base element each having a series of concentrically arranged teeth on a base plate, wherein the teeth that slidably engage one another in a slicing motion to form grinding surfaces against one another, wherein the teeth are serrated to efficiently grind the dried materials in the chamber when the teeth engage one another and are counter rotated relative to one another. In one embodiment the chamber discharges the ground contents through orifices in the base element, where the size is regulated by a screen, and in another embodiment, the ground contents remain in the chamber until the grinding head is removed.

11 Claims, 11 Drawing Sheets

(56) References Cited

U.S. PATENT DOCUMENTS

| | | | | |
|---|---|---|---|---|
| 7,367,519 B2* | 5/2008 | de Groote | ............... | A47J 19/04 241/168 |
| 7,422,170 B2* | 9/2008 | Bao | ............... | B02C 18/24 241/168 |
| 8,083,167 B1* | 12/2011 | Namakian | ............... | A47J 19/06 241/169.1 |
| 8,186,611 B1* | 5/2012 | Boer | ............... | A23N 17/007 241/260.1 |
| 8,393,563 B2* | 3/2013 | Chaoui | ............... | B02C 18/08 241/168 |
| 8,695,906 B2* | 4/2014 | Hainbach | ............... | A47J 42/14 241/169.1 |
| 8,733,679 B2* | 5/2014 | Camitta | ............... | B02C 18/16 241/169.1 |
| 2002/0030131 A1* | 3/2002 | Schilling | ............... | D01B 1/24 241/74 |
| 2003/0015611 A1* | 1/2003 | Teng | ............... | A47J 19/06 241/169.1 |
| 2009/0114752 A1* | 5/2009 | Carpenter | ............... | B02C 13/095 241/282.1 |
| 2009/0224088 A1* | 9/2009 | Ruzycky | ............... | A47J 19/06 241/169.1 |
| 2010/0044485 A1* | 2/2010 | Delbridge | ............... | A47J 42/08 241/169.1 |
| 2012/0085848 A1* | 4/2012 | Sharp | ............... | B02C 15/16 241/36 |
| 2013/0025608 A1* | 1/2013 | Fakhouri | ............... | A24F 9/16 131/311 |

\* cited by examiner

HERB GRINDER

CROSS-REFERENCES TO RELATED APPLICATIONS

This is a continuation-in-part of co-pending patent application Ser. No. 13/433,060 filed Jun. 11, 2012 in the name of Mark E. Edwards, the content of which is incorporated herein by reference in its entirety.

STATEMENT AS TO RIGHTS TO INVENTIONS MADE UNDER FEDERALLY SPONSORED RESEARCH AND DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

This invention relates to processing of herbs, in particular to the grinding of herbs and more particularly to the shredding of dried leaves, such as laurel and tobacco, into a powder.

Herbs are natural products with a variety of uses, including seasoning and medicinal applications. However, uses typically require some form of processing to render them useful. Food processors are well-known for preparing powders and slurries from nuts, stalks and the like. Grinders and shredders are known for processing dried leaves. Known devices for preparing leaves have in the past not always been capable of producing satisfactorily shredded or powdered end product.

What is needed is an improvement in the technology of leaf shredders or grinders for preparing dried leaves.

The following references were cited in the course of prosecution of the related patent parent application:
U.S. Pat. No. 8,393,563 dated March 2013 to Chaoui et al.;
U.S. Patent Publication No. 2003/0015611 A1 dated January 2003 to Eric Y. Teng;
U.S. Pat. No. 7,367,519 B2 dated May 2008 to De Groote et al.;
U.S. Pat. No. 7,422,170 B2 dated September 2008 To Fan Bao; and
U.S. Pat. No. 7,886,999 B2 dated February 2011 to Ewhan Ruzycky.

BRIEF SUMMARY OF THE INVENTION

According to the invention, a shredder or grinder for dried material such as herbs of dried leaves comprises a cylindrical container comprising a top element and a base element forming a grinding chamber, the top element and the base element each having a series of concentrically arranged teeth on a base plate, wherein the teeth slidably engage one another in a slicing motion to provide grinding surfaces against one another, wherein the teeth are serrated to efficiently grind the dried materials in the chamber when the teeth engage one another and are counter rotated relative to one another. In one embodiment the chamber discharges the ground contents through orifices in the base element, where the size is regulated by a screen, and in another embodiment, the ground contents remain in the chamber until the grinding head is removed. This invention provides a portable, compact and efficient mechanism for producing a ground product from dried leaves.

The invention will be better understood by reference to the following detailed description in connection with the accompanying drawings.

DETAILED DESCRIPTION OF THE INVENTION

Figure 2A:
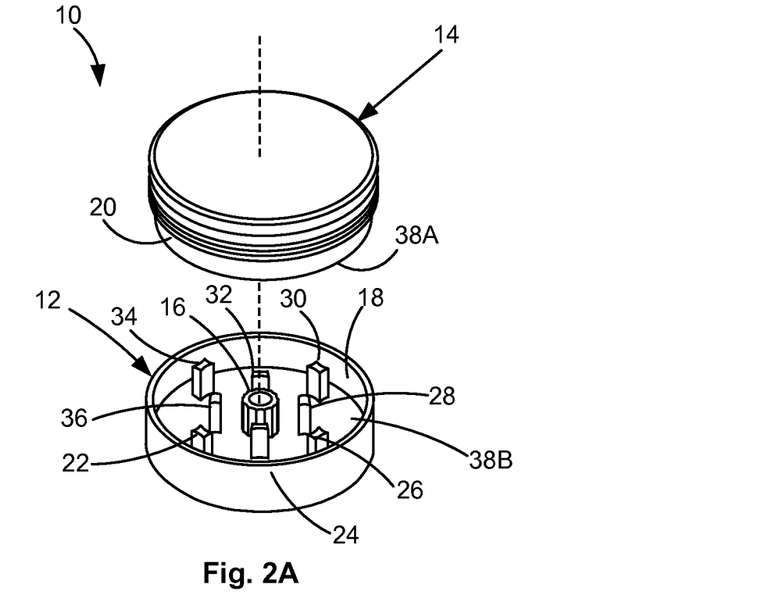
FIG. 2A is an exploded view of a first embodiment of the invention comprising a top and a base, in each of which cutting teeth of FIGS. 1A-1E may be employed.
Figure 2B:
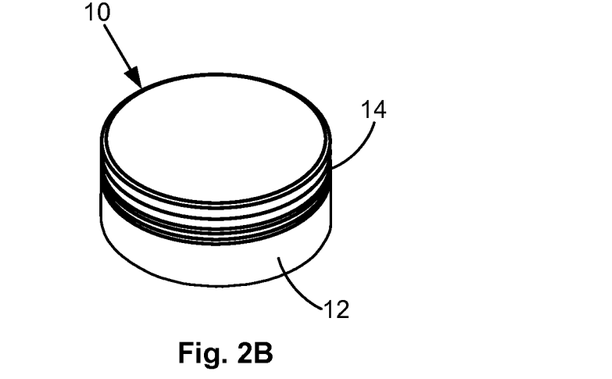
FIG. 2B is a perspective view of the first embodiment of the invention wherein the two parts are engaged.

Referring to FIG. 2A and FIG. 2B, there is shown a representative two-piece grinder 10 according to the invention comprising a base element 12 and a top element 14. As herein explained, the top element 14 engages the base element 12 and is rotatable with respect to the base element 12 about a common axis defined by a center 16 and constrained by a rim 18 of the base element 12 in slidable contact with a circumferential flange 20 of the top element 14. The top element 14 is a cylinder that is mated to the base element 12. In accordance with the invention, a plurality of spaced-apart teeth 22, 24, 26, 28, 30, 32, 34, 36 of a particular form factor are provided in the interior of the base element 12 in concentric rings and that engage other spaced-apart teeth (FIGS. 8D and 8E) also arranged in concentric rings disposed in concentric channels within the top element 14 so as to scrape against the teeth in the opposing element when the top element 14 and the base element 12 are engaged and are rotated relative to one another. The chamber 38A, 38B formed by the mating of the top element 14 and the base element 12 is for receiving and grinding dried materials by the counter rotating motion of the top element 14 and base element 12.

The number of rows of teeth vary with the size and design of the grinder 10, although the design of the teeth may be common to all embodiments. FIG. 2A is a representative small embodiment of a grinder 10 of a two-piece design with two concentric rows of teeth according to the invention.

Figure 3:
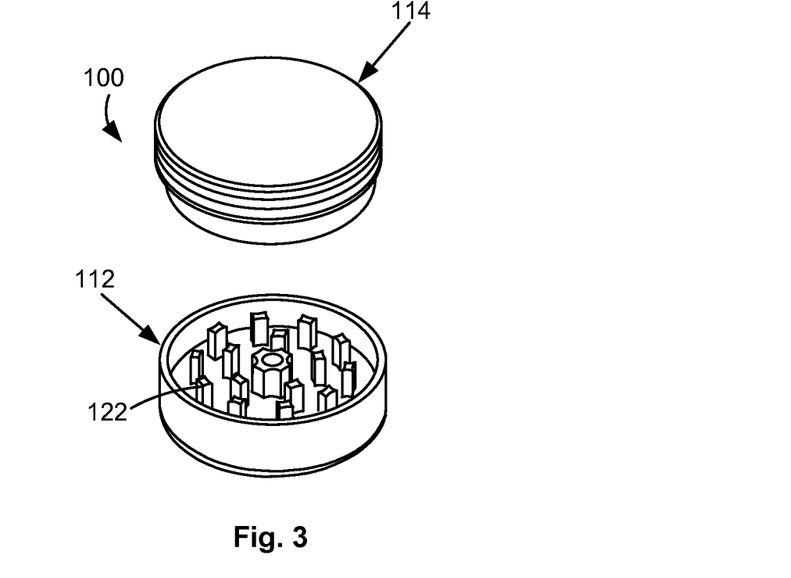
FIG. 3 is an exploded view of a second embodiment of the invention.

FIG. 3 is a representative medium-sized embodiment of a grinder 100 of a two-piece design with two concentric rows in the base element 112 with a greater number of teeth 122 than in FIG. 2A according to the invention. The top element 114 is appropriately configured to mate with the base element 112.

Figure 4:
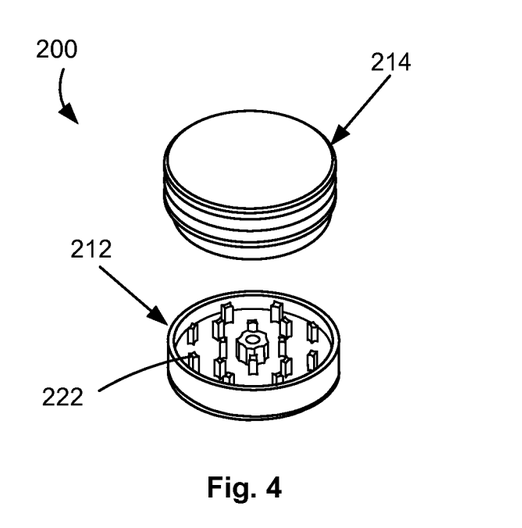
FIG. 4 is an exploded view of a third embodiment of the invention.

FIG. 4 is a representative larger-sized embodiment of a grinder 200 of a two-piece design with three concentric rows in the base element 212 with a greater number of teeth 222 than in FIG. 2A or FIG. 3 according to the invention. The top element 214 is appropriately configured to mate.

Figure 5A:
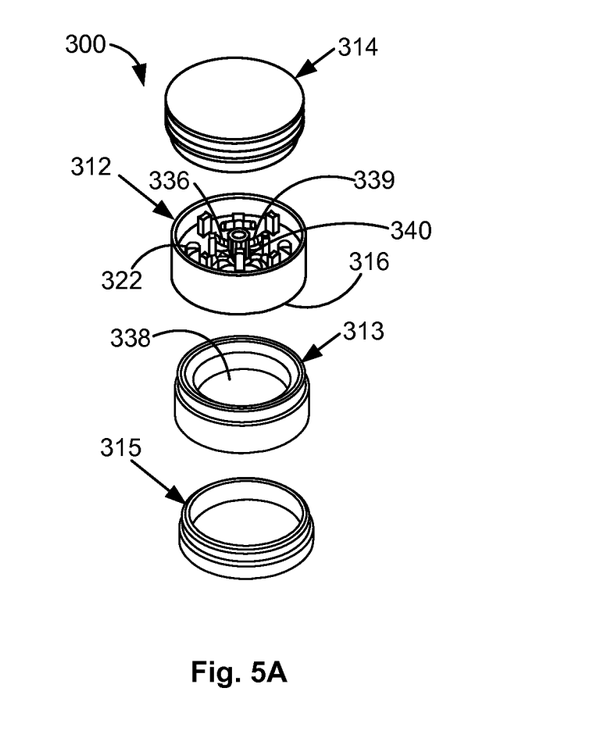
FIG. 5A is an exploded view of a fourth embodiment of the invention comprising two sections in which cutting teeth of FIGS. 1A-1E may be employed and a two-part reservoir.
Figure 5B:
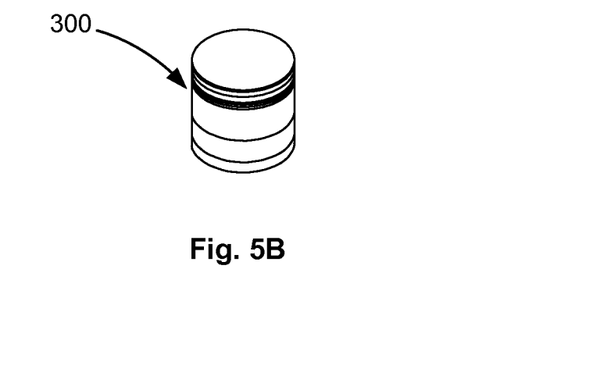
FIG. 5B is a perspective view of the fourth embodiment of the invention wherein the four parts are engaged.

FIGS. 5A and 5B form a representative small-sized embodiment of a four-piece grinder 300 with two concentric rows of teeth 222 in the base element 312 and a mating top element 314. In this embodiment, one or more orifices 336 are provided in the bottom 316 of the base element 312 to enable discharge of ground material without disassembling the top element 314 from the base element 312. An optional magnet 340 is located in the base element 312 to capture any magnetic debris. A receiving chamber 338 is formed by ring 313 enclosed by base lid 315 and the bottom 316 of the base element 312. The ring 313 is threaded at each end to engage the adjacent elements. The length of the ring 313 largely determines the capacity of the chamber 338. A screen 339 in the bottom 316 may be provided with a mesh size to assure that ground particles are of no more than a design maximum size. (Optionally a second, finer-meshed screen may be provided at the bottom of the ring 313 to collect fine sized grounds in the base lid 315.)

Figure 6A:
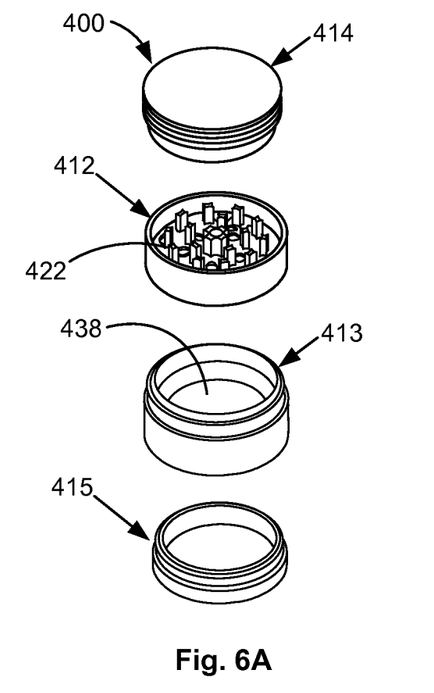
FIG. 6A is an exploded view of a fifth embodiment of the invention comprising two sections in which cutting teeth of FIGS. 1A-1E may be employed and a two-part reservoir.
Figure 6B:
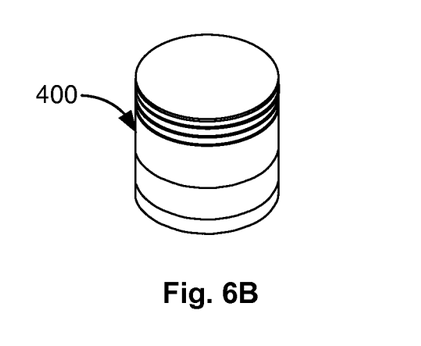
FIG. 6B is a perspective view of the fifth embodiment of the invention wherein the four parts are engaged.

Similarly FIGS. 6A and 6B illustrate a representative medium-sized four-piece grinder 400.

Figure 7A:
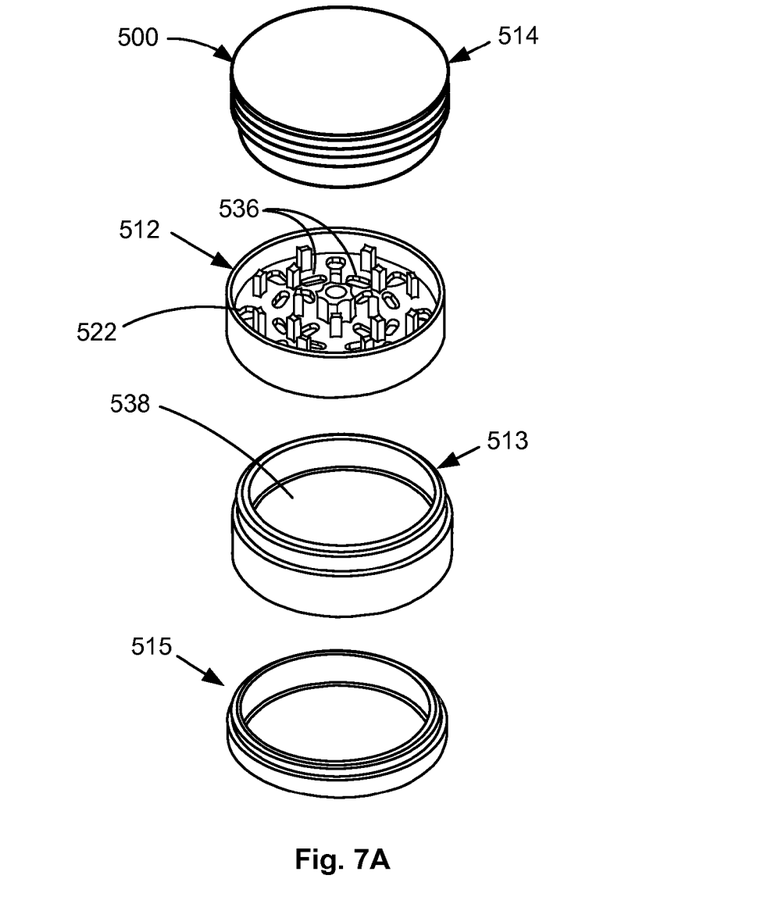
FIG. 7A is an exploded view of a sixth embodiment of the invention comprising two sections in which cutting teeth of FIGS. 1A-1E may be employed and a two-part reservoir.
Figure 7B:
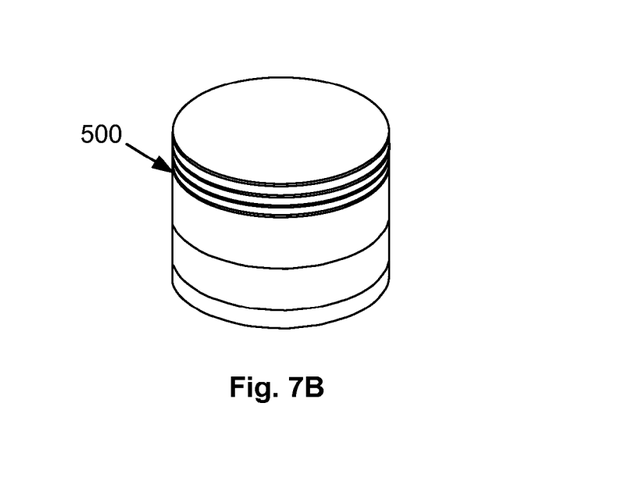
FIG. 7B is a perspective view of the sixthth embodiment of the invention wherein the four parts are engaged.

Similarly FIGS. 7A and 7B illustrate a representative large-sized four-piece grinder 400. All of these embodiments are small enough to be held in the hand and operated manually.

Figure 1A:
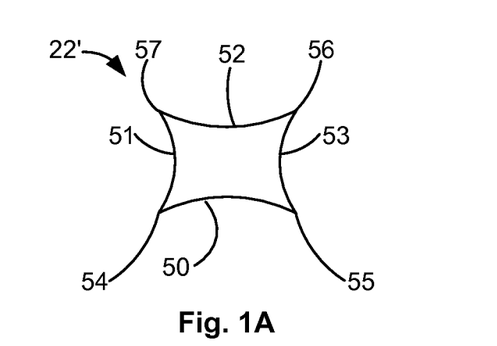
FIG. 1A is a cross section of a first embodiment of a cutting tooth according to the invention.
Figure 1B:
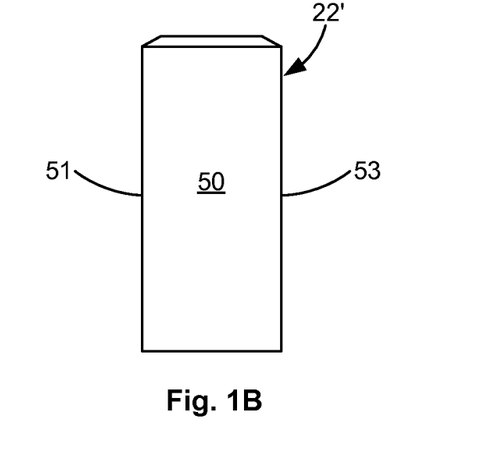
FIG. 1B is a side view of the first embodiment of a cutting tooth according to the invention.

Referring now to FIG. 1A and FIG. 1B, there is shown a detail of one embodiment of a tooth 22' found in either the top element 14 or the base element 12. The tooth 22' of FIG. 1A comprises a straight cylinder with generally parallel faces 50, 52 and 51, 53, wherein on at least two adjacent sides 50, 51 there is formed a concave longituinal profile to their edges so as to define an enhanced blade edge 54. The blade edges 54-57 constitute the cutting component working with complementary blade edges of the opposing element.

Figure 1C:
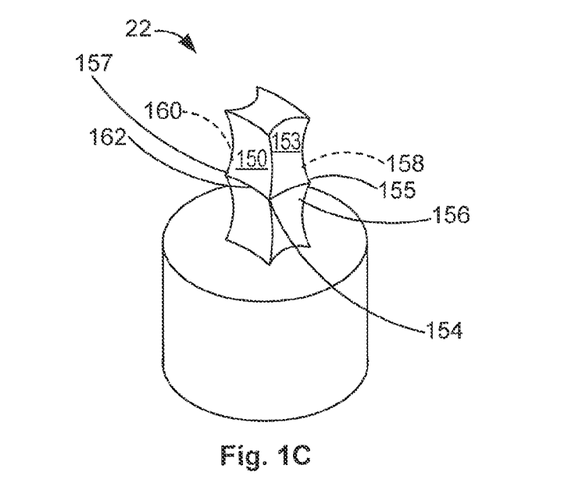
FIG. 1C is a perspective view of a second embodiment of a cutting tool on a section of a base according to the invention.
Figure 1D:
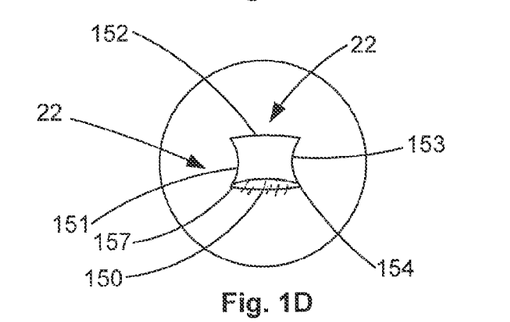
FIG. 1D is a cross section of the second embodiment of a cutting tooth according to the invention.
Figure 1E:
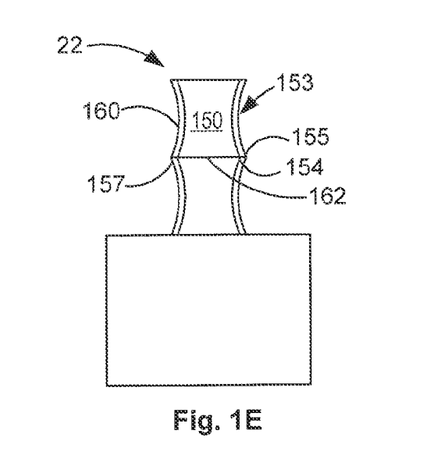
FIG. 1E is a side view of the second embodiment of a cutting tooth according to the invention.

In a more preferred embodiment, the blade is serrated. Referring now to FIG. 1C, FIG. 1D and FIG. 1E, there is shown a detail of a second embodiment of a tooth 22 found in either the top element 14 or the base element 12. The tooth 22 of FIG. 1C comprises a straight cylinder with generally parallel faces 150, 152 and 151, 153, wherein on at least two adjacent sides 150, 151 there is formed a concave longituinal profile to their edges and perpendicular serrations 156, 158, 160, 162 across the faces 150-153 the so as to define at least one enhanced serrated blade edge 154. The blade edges 154-157 constitute the cutting surface with complementary blade edges of the opposing element. One of the faces 152, namely the face that confronts the outer edge of the element may have a convex longitidinal profile whose curvature matches the curvature of the circumference at the established radius of the element. Similarly the face 150 facing the center of the element may have a concave curvature that matches the curvature of the circumference of the element at that established radius of the element. This design feature follows from the manufacturing process as hereinafter explained. In addition the teeth may be of differing lengths.

Figure 8A:
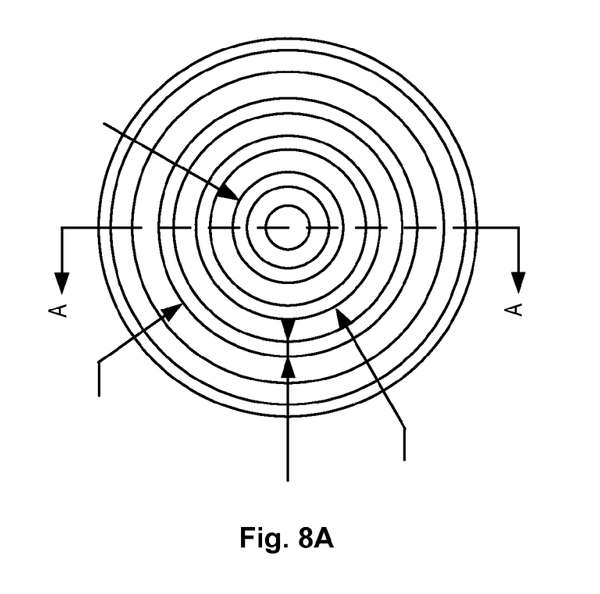
FIGS. 8A-8E is a series of drawings illustrating the milling and lathe processes of a cutting head top of the type shown in the embodiment of FIG. 4.
Figure 8B:
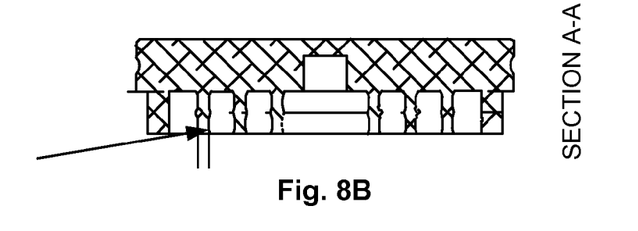
Figure 8C:
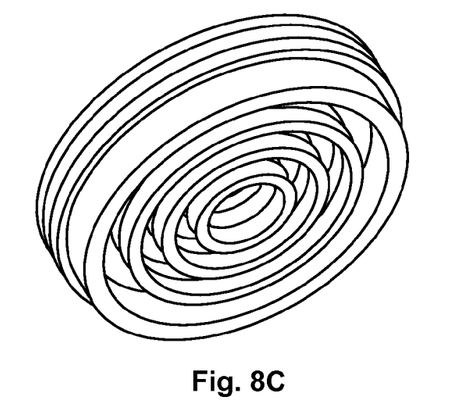
Figure 8D:
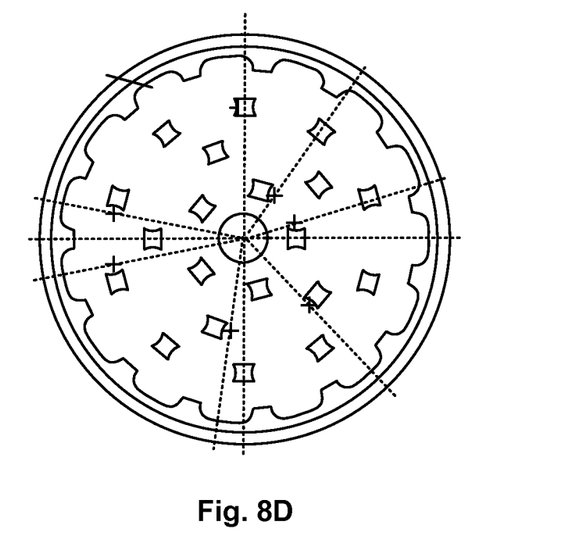
Figure 8E:
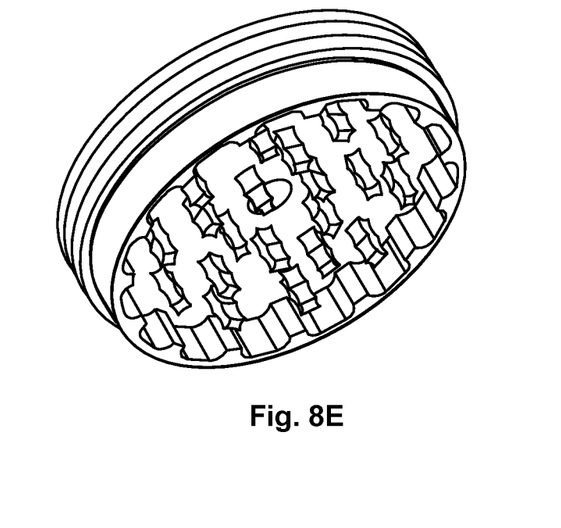
Figure 9A:
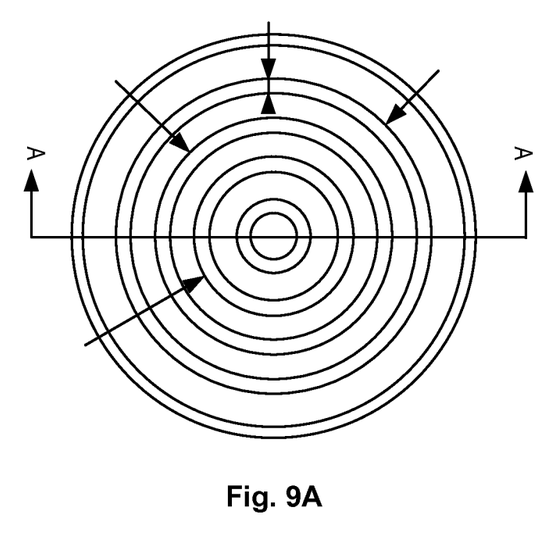
FIGS. 9A-9E is a series of drawing illustrating the milling and lathe processes of a cutting head base of the type shown in the embodiment of FIG. 4.
Figure 9B:
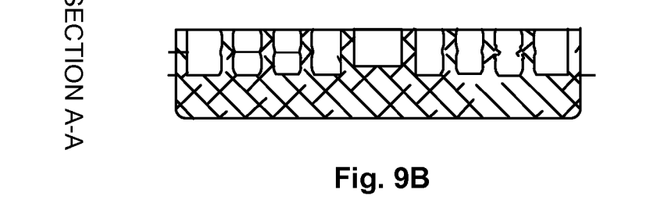
Figure 9C:
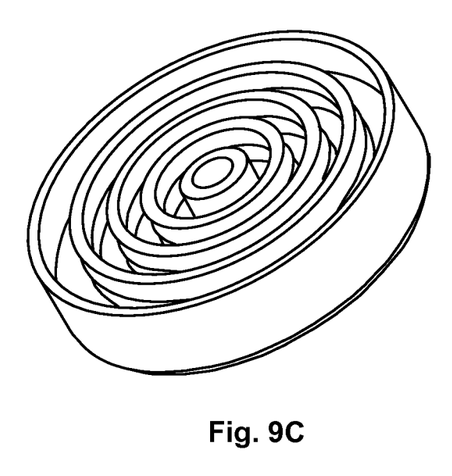
Figure 9D:
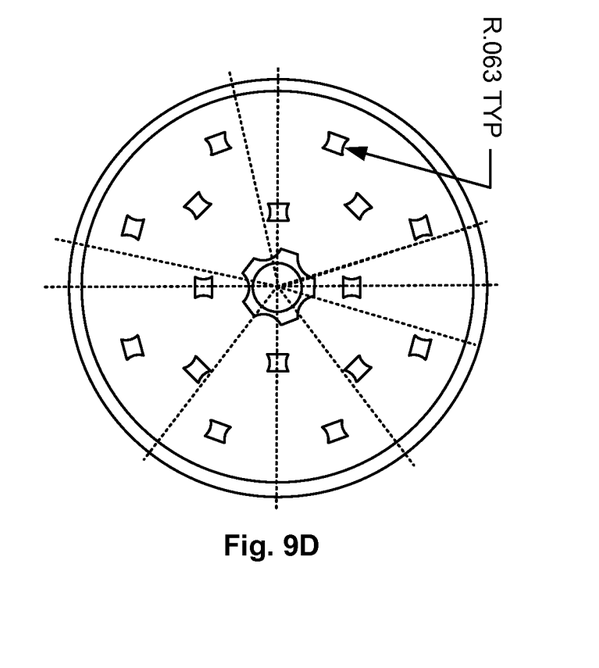
Figure 9E:
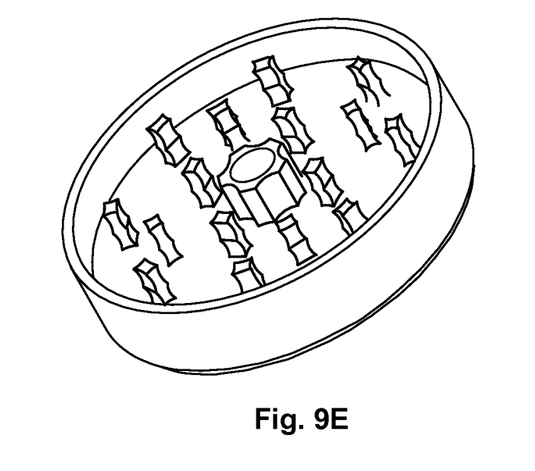

FIGS. 8A through 8E illustrate an exemplary top element 14 at various stages of manufacturing. The process involves cutting metal stock into concentric rings on a face in the cylindrical base stock with a lathe tool having a head that shapes the inner and outer surfaces of the rings with at least a pair of concave channels (FIG. 8B). The result is a piece having a plurality of concentric rings protruding from the cylindrical base stock (FIG. 8C). Thereafter a milling operation cuts the rings with a head having a multilevel convex face to carve out concave features that form from the ring material the intended serrated teeth (FIG. 8D and FIG. 8E). A similar process is used to carve out serrated teeth in the base element stock material (FIGS. 9A-9E), wherein the teeth in the base element 12 are disposed to be intersticed with the teeth of the top element 14 to track in noninterfering paths with slicing motion when the top element and base element are counter-rotated. The placement of the multiple cutting teeth in the grinder is intended to promote optimal grind efficiency.

The invention has been explained with reference to specific embodiments. Other embodiments will be apparent to those of ordinary skill in the art. Therefore it is not intended that the invention be limited, except as indicated by the appended claims.

What is claimed is:

1. A device comprising:
   a first cylindrical element having a first cylindrical wall surrounding a circular a base disk, the base disk having a first set of protruding teeth disposed in a plurality of first concentric rings on a first side of the base disk, the first cylindrical element defining in a first chamber for receiving dried materials to be ground;
   a second cylindrical element having a top disk, the top disk having a second set of protruding teeth disposed in a plurality of second concentric rings on a first side of the top disc, the second cylindrical element being configured to fit into in the first chamber such that the second set of protruding teeth slidably engage with the first set of protruding teeth, the first set of protruding teeth and the second set of protruding teeth each having serrations along their longitudinal dimension, confronting faces of opposing first set of of protruding teeth and second set of protruding teeth being configured to in order to produce a ground output when the first cylindrical element is rotated relative to the second cylindrical element around an axis common to the base disk and the top disk.

2. The device of claim 1 further comprising orifices in the base disk for discharging grounds from the first chambers.

3. The device of claim 2 further comprising a screen between the first chamber and the orifices and having a mesh size sufficiently small to pass only desired sizes of the ground output from the first chamber.

4. The device according to claim 3 further including a second chamber for collecting the ground output from the first chamber.

5. The device according to claim 4 wherein the first and second sets of protruding teeth each comprise four faces having concave surfaces along their longitudinal dimension, at least one of the concave faces having lateral protrusions extending laterally across each of the teeth to form the serrations.

6. The device according to claim 5 wherein the serrations are formed on all sides of each of the teeth.

7. The device according to claim 1 wherein each of the protruding teeth comprise four faces, at least one of the four faces having a concave surface along its longitudinal dimension, said at least one of the concave faces having a protrusion extending laterally across to form the serrations.

8. The device according to claim 7 wherein the serrations are formed on all sides of all teeth of the first and second sets of the protruding teeth.

9. The device of claim 7 wherein the face of the teeth of the first disk and of the second disk that is facing toward the center of the disk element has a concave lateral curvature that matches the curvature of the circumference of the element at that established radius of the element.

10. The device of claim 9 wherein the face of the teeth of the first disk and of the second disk that is facing away from the center of the disk element has a convex lateral curvature that matches the curvature of the circumference of the element at that established radius of the element.

11. The device of claim 1 wherein selected ones of the teeth of the first disk and of the second disk are of differing lengths.

\* \* \* \* \*